July 24, 1951    W. W. BOGGS    2,561,685
FILTER
Filed Sept. 30, 1946    2 Sheets-Sheet 1

INVENTOR:
WALTER W. BOGGS,
BY HIS ATTORNEYS
HARRIS, KIECH, FOSTER & HARRIS,

July 24, 1951     W. W. BOGGS     2,561,685
FILTER
Filed Sept. 30, 1946     2 Sheets-Sheet 2
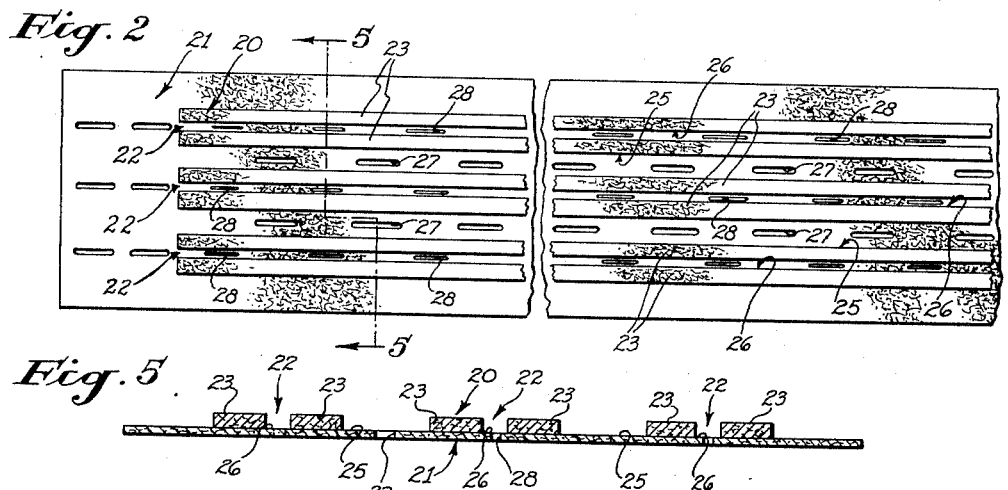
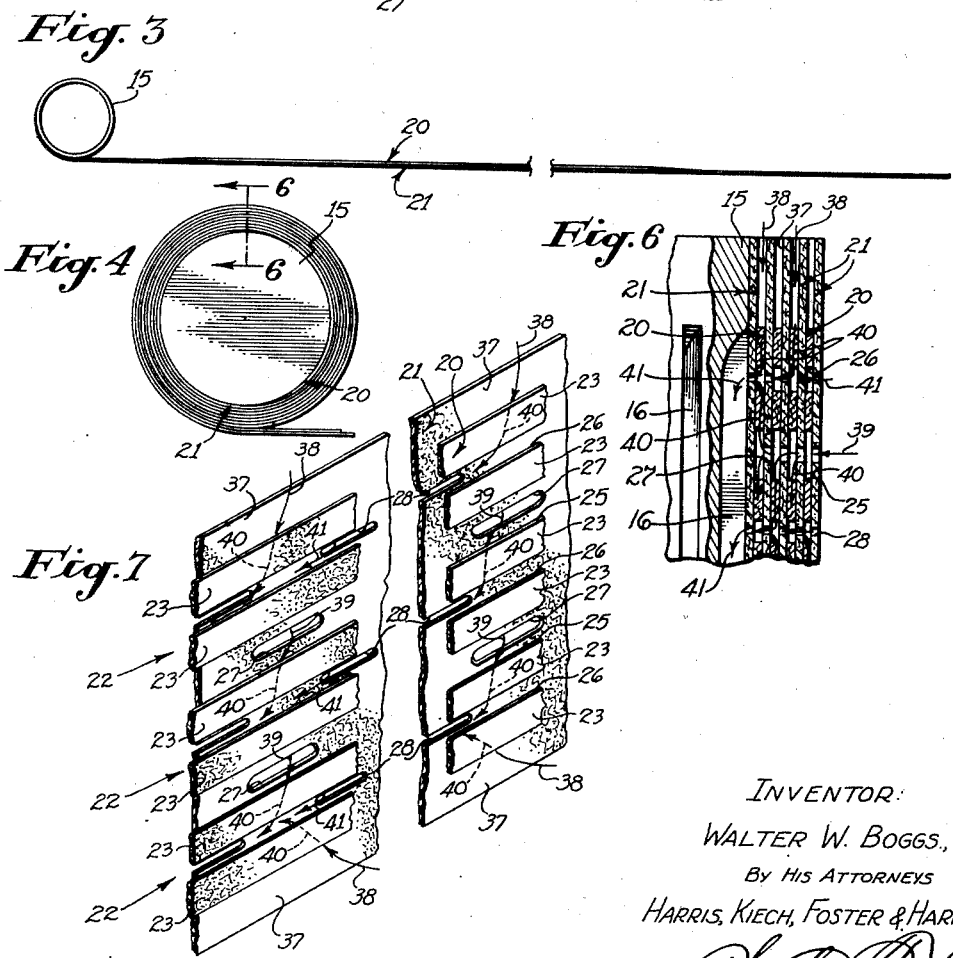
INVENTOR:
WALTER W. BOGGS,
By His Attorneys
HARRIS, KIECH, FOSTER & HARRIS, Patented July 24, 1951

2,561,685

UNITED STATES PATENT OFFICE 2,561,685

FILTER

Walter W. Boggs, Downey, Calif., assignor to Luber-Finer Incorporated, Los Angeles, Calif., a corporation of California Application September 30, 1946, Serial No. 700,189

9 Claims. (Cl. 210—169)

My invention relates in general to devices for removing foreign matter from fluids and, more specifically, to filters which are particularly adapted for removing any foreign matter suspended in such fluids as the oil employed to lubricate internal combustion engines. I prefer to consider filters of this general character herein for convenience in disclosing the invention, although it will be understood that I do not intend to be limited thereto since the invention is susceptible to various other applications as will be apparent to those skilled in the art.

In general, it is a primary object of my invention to provide a filter element wherein the oil or other fluid being filtered flows through and/or between a plurality of layers of cohesive filtering material which remove any foreign matter suspended in the oil.

The filtering material is preferably of a fabric or fibrous nature so as to resist disintegration when exposed to the oil, thereby preventing a breakdown of the filter element and preventing channeling of the unfiltered oil through the element, which is an important object of my invention.

Another object of the invention is to provide a simple, compact filter element of relatively small dimensions which is adapted to receive large amounts of foreign matter before becoming loaded. A related object is the provision of a filter element which may be used in the oil circulating systems of internal combustion engines for extended periods of time before becoming loaded with foreign matter under normal operating conditions.

More specifically, an object of my invention is to provide a filter element of the foregoing general character wherein alternate layers of the filtering material include elongated portions or strips which separate the spaces between the layers thereadjacent into a plurality of inlet and outlet channels, the inlet channels being adapted to conduct unfiltered oil into the element and being adapted to receive the foreign matter therein, and the outlet channels being adapted to conduct the filtered oil from the element.

A further object of the invention is to provide a filter element wherein the inlet channels are large as compared to the outlet channels so as to provide a maximum of space for receiving the foreign matter removed from the oil.

An important object is to provide a filter element wherein the strips, i. e., the elongated portions of the alternate layers, which separate the inlet channels from the outlet channels are all of substantially uniform width to provide a uniform filtering action throughout the entire element. Another important object is to provide a filter element wherein the total length of all the strips separating the inlet channels from the outlet channels is extremely large as compared to the dimensions of the element so as to provide a large filtering area between the inlet and outlet channels.

A further object is to provide a filter element wherein the aforesaid alternate layers are thicker than the layers thereadjacent and may be of laminated construction to further increase the filtering area between the inlet and outlet channels.

In the preferred form of my invention, it is an object to provide a filter element comprising a pair of elongated sheets which are wound on a central core in such a manner that each sheet comprises alternate turns thereon, one of the sheets including elongated portions or strips which separate the spaces between the turns of the other sheet into a plurality of inlet and outlet channels.

Additional objects of my invention include the provision of a filter element which is efficient and reliable, which is simple and inexpensive to manufacture, and which may be replaced inexpensively when loaded with foreign matter.

The foregoing objects of my invention and the advantages suggested thereby, together with various other objects and advantages will be evident hereinafter, may be realized by means of the embodiments which are illustrated in the accompanying drawings and are described in detail hereinafter. Referring to the drawings, which are intended as illustrative:

Figs. 2, 3 and 4 are views showing the filter element in partially completed form;

Fig. 5 is an enlarged sectional view which is taken along the broken line 5—5 of Fig. 2;

Fig. 6 is an enlarged, fragmentary sectional view which is taken along the broken line 6—6 of Fig. 4;

Fig. 7 is a fragmentary perspective view illustrating flow through the filter element.

Figure 1:
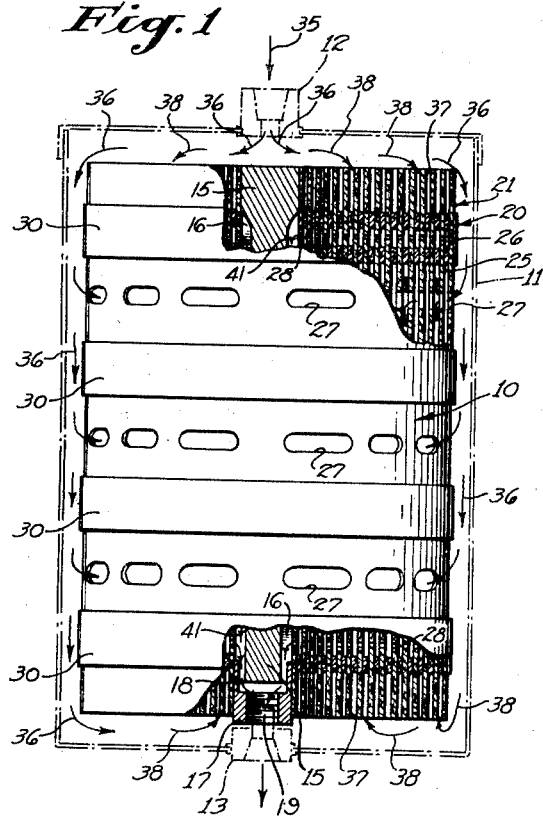
Fig. 1 is an elevational view of a filter element which embodies the fundamental principles of my invention, portions of the element being shown in section to reveal the internal structure thereof.

Referring particularly to Fig. 1, I show a filter including a filter element 10 which is disposed in a housing or container 11, the walls of the container being spaced from the element to permit flow of unfiltered oil therebetween. The container 11 is provided with an inlet fitting 12 and an outlet fitting 13 to which suitable inlet and outlet lines (not shown) for unfiltered and filtered oil, respectively, may be connected. The inlet and outlet lines may, for example, form part of the oil circulating system of an internal combustion engine.

The filter element 10 includes a central core 15 which is splined from the lower end thereof to a point adjacent the upper end thereof, as viewed in Fig. 1, so as to provide a plurality of grooves 16 which are adapted to conduct filtered oil to an outlet fitting 17 as will be described in more detail hereinafter. The fitting 17 includes a cup-shaped portion 18 which is telescoped over the splined lower end of the central core 15, as viewed in Fig. 1, to collect the filtered oil flowing in the grooves 16, the fitting 17 being provided with a bore 19 into which the outlet fitting 13 is adapted to be threadedly inserted as shown in Fig. 1. The filter element 10 is secured to the container 11 solely by the threaded connection between the outlet fittings 13 and 17 so that the element may be removed or installed readily.

The filter element 10 includes a pair of elongated sheets 20 and 21 of cohesive filtering material which are wound on the central core 15 in such a manner that each sheet forms alternate turns or layers on the core. The material forming the sheets 20 and 21 is preferably of a fabric of fibrous nature to resist disintegration by the oil, various suitable materials of this nature being available. Consequently, I do not intend to be limited to any specific material.

The sheets 20 and 21 forming the filter element 10 are best shown in Fig. 2 which represents a development of the element, the sheets being laid out flat in contact with each other. For convenience, Fig. 2 may be considered as showing the sheets 20 and 21 prior to being wound on the central core 15, if desired. It will be understood, however, that the sheets 20 and 21 need not be laid out flat before being wound on the core 15, since they may be fed onto the core from rolls (not shown), or in any other suitable manner.

The sheet 20, which hereinafter will be termed the primary sheet for convenience, includes a plurality of pairs 22 of separate, continuous strips 23 which extend longitudinally of the sheet 21, which hereinafter will be termed the secondary sheet, the strips extending circumferentially of the filter element 10 when the sheets are wound upon the core 15. The spaces between adjacent pairs 22 of the strips 23 provide inlet channels 25 which extend circumferentially of the filter element 10 and which are adapted to conduct unfiltered oil thereinto. The space between the strips 23 of each of the pairs 22 provides an outlet channel 26 which also extends circumferentially of the filter element 10, the outlet channels being adapted to conduct filtered oil from the element and being separated from the inlet channels 25 by the strips 23. The secondary sheet 21 is provided with a plurality of inlet openings or slots 27 which communicate with the inlet channels 25, and is provided with outlet openings or slots 28 therein which may be elongated, round or of any desired shape, and which communicate with the outlet channels 26.

When the sheets 20 and 21 are wound on the central core 15, as illustrated in Figs. 3 and 4, the inlet and outlet channels 25 and 26 spiral outwardly from the core, the various radially spaced portions of each inlet channel being separated by the secondary sheet 21 and being interconnected by the inlet openings 27, and the various radially spaced portions of the outlet channel similarly being separated by the secondary sheet and being interconnected by the outlet openings 28 as best shown in Figs. 1 and 6. The longitudinal grooves 16 in the central core 15 communicate with the outlet channels 26 and outlet openings 28, as best shown in Fig. 6. Thus, the radially spaced portions of the inlet channels 25 and the inlet openings 27 provide radially extending inlet passages which are adapted to conduct unfiltered oil into the filter element 10, and the radially spaced portions of the outlet channels 26 and the outlet openings 28 provide radially extending outlet passages which are adapted to conduct filtered oil to the central core 15, the oil being filtered in traversing the strips 23 from the inlet channels into the outlet channels as will be discussed in more detail hereinafter. The aforesaid radially extending inlet and outlet passages may be somewhat labyrinthine in nature since the various inlet openings 27 and outlet openings 28 may not register exactly to provide linear passages interconnecting the various radially spaced portions of the inlet and outlet channels 25 and 26, although these passages have been indicated as linear in Figs. 1 and 6 to show clearly that all of the radially spaced portions of each inlet channel 25 and all of the radially spaced portions of each outlet channel 26 are interconnected.

As best shown in Figs. 3 and 4, approximately one full turn of the secondary sheet 21 is wound on the central core 15 before the first turn of the primary sheet 20 consisting of the strips 23 is started so as to close the inner ends of the inlet and outlet channels 25 and 26. Similarly, enough of the secondary sheet 21 is wound over the last turn of the primary sheet to close the channels provided by the primary sheet. If the outlet openings 28 extend to the last or outermost turn of the secondary sheet 21, they may be sealed by wrapping tape 30, or the like, around the filter element 10, as shown in Fig. 1, to prevent flow of unfiltered oil into the outlet channels 26.

Considering the general operation of the filter element 10, unfiltered oil flows into the container 11 through the inlet fitting 12, as indicated by the arrow 35 in Fig. 1, and into the space surrounding the filter element as indicated by the arrows 36. Some of the unfiltered oil flows into the spaces 37 between adjacent turns of the secondary sheet 21 at either end of the filter element 10, as indicated by the arrows 38 in Figs. 1, 6 and 7, and the remainder flows into the inlet channels 25 through the inlet openings 27 in the secondary sheet as indicated by the arrows 39. The oil then flows past the strips 23 and into the outlet channels 26 as indicated by the arrows 40 in Figs. 1, 6 and 7, foreign matter such as solids suspended in the oil being filtered therefrom and being deposited in the inlet channels 25 and in the spaces 37 in a manner to be discussed hereinafter as the oil traverses the strips. From the outlet channels 26, the filtered oil flows through the outlet openings 28 and into the grooves 16 in the central core 15, as indicated by the arrows 41, and then out through the outlet fittings 17 and 13. If desired, the outlet openings 28 in the secondary sheet 21 may be omitted since it will be apparent that the filtered oil may also flow through the outlet channels 26 along inwardly spiralling paths to the grooves 16 in the central core 15.

I have not been able to ascertain definitely the exact path or paths followed by the oil in traversing the strips 23, and consequently, do not desire to be restricted to the following discussion thereof. However, I believe that some of the oil may flow between the strips 23 and the turns of the secondary sheet 21 in contact therewith, and that some of the oil may flow through the material forming the strips. Any spaces between the strips 23 and the turns of the secondary sheet 21 in contact therewith are sufficiently minute to prevent the passage of any foreign matter suspended in the oil while possibly permitting some of the oil to flow therethrough. The texture of the filtering material comprising the sheets 20 and 21 is, of course, such that foreign matter cannot pass therethrough during flow of the oil past the strips 23, although some of the oil may do so.

As best shown in Fig. 2, the inlet channels 25 and spaces 37 are large as compared to the outlet channels 26 so that the percentage of the total volume of the filter element 10 which is occupied by the inlet channels and the spaces 37 is large to provide a maximum of space for receiving foreign matter removed from the oil, the outlet channels preferably being relatively narrow substantially as illustrated. This construction permits the filter element 10 to remove a much larger quantity of foreign matter from the oil before becoming loaded therewith than would otherwise be possible, and thus materially extends the useful life of the element. It will be apparent that the capacity of the filter element 10 for foreign matter may be varied by increasing or decreasing the width, thickness, or number of the strips 23 to vary the size of the inlet channels 25 and spaces 37, as desired.

It will be noted that the strips 23 are shown as being of substantially uniform width throughout the entire length thereof. This construction provides substantially uniform resistance to flow through and/or around the strips 23 at all points thereon, thereby providing a substantially uniform filtering action throughout the entire filter element 10 and avoiding any tendency for all of the oil to flow past the strips at only a relatively few points. Such uniform distribution of the flow past the strips 23, coupled with the fact that the sheets 20 and 21 are formed of cohesive disintegration-resistant material, virtually eliminates any possibility of a breakdown of any portion of the filter element 10 which would permit channeling of unfiltered oil therethrough.

As best shown in Fig. 2, the length of each strip 23 is great as compared to the dimensions of the filter element 10, thereby providing a large filtering area through which the oil may flow in traveling from the inlet channels 25 to the outlet channels 26, and thereby distributing the flow of oil so that only a minute amount flows past the strips 23 at any one point. The filtering area through which the oil may flow in traversing the strips 23 may be increased by employing strips which are relatively thick as compared to the secondary sheet 21, as best shown in Fig. 5. Since the secondary sheet 21 serves as a spacer for the turns of the strips 23, the secondary sheet is preferably as thin as possible consistent with the strength requirements thereof so that a maximum number of turns of the strips may be employed in a filter element of given dimensions. The filtering area may be further increased by employing strips 23 which are of laminated construction, if desired. An incidental and highly desirable result of employing thick strips 23 and a thin secondary sheet 21 to increase the filtering area is to increase the capacity of the filter element for foreign matter since such a construction increases the percentage of the total volume of the element which is occupied by the inlet channels 25 and spaces 37.

The large filtering areas provided by the foregoing constructions greatly increase the number of minute passages through which the oil may flow in traversing the strips 23, thereby distributing the flow more widely and increasing the efficiency of the filter element by reducing the size of the individual streams of oil traversing the strips. Such a wide distribution of the flow also contributes to the virtual elimination of any possibility of a breakdown of the element which would permit channeling of unfiltered oil therethrough by reducing the quantity of oil flowing through and/or around the strips 29 at any one point to a minute amount.

Figure 8:
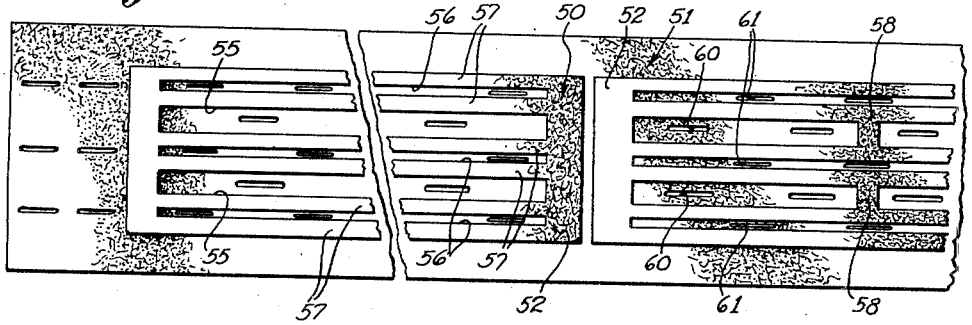
Fig. 8 is a view which is similar to Fig. 2, but which illustrates a modified form of my invention.

The modified form of my invention which is illustrated in Fig. 8 includes a primary sheet 50 and a secondary sheet 51 which may be wound upon a core such as the core 15 to provide a filter element which is similar to the element 10. The primary sheet 50 includes a series of elongated sheets 52 which are laid end to end in contact with the secondary sheet 51, each of the sheets 52 having relatively wide, elongated openings or slots therein which provide inlet channels 55, and having similar but narrower openings therein which provide outlet channels 56. The inlet channels 55 are separated from the outlet channels 56 by interconnected strips 57 which perform the same function as the strips 23 of the filter element 10. If desired, the strips 57 may be interconnected at spaced intervals by webs 58 to reinforce the sheets 52.

The secondary sheet 51 is provided with inlet openings or slots 60 which communicate with the inlet channels 55 and which perform the same function as the inlet openings 27 of the filter element 10. Similarly, the secondary sheet 51 is provided with outlet openings or slots 61 which communicate with the outlet channels 56 for the reasons discussed previously.

The operation of the modified form shown in Fig. 8 is similar to that of the filter element 10 and will not be described in detail.

My invention thus provides filter elements which are adapted to remove large quantities of foreign material from lubricating oils or other fluids before the capacities thereof are reached and which are adapted to remove the foreign matter in an efficient manner. The large filtering areas of the elements result in an efficient filtering action by distributing the flow of oil substantially uniformly throughout the element so that the individual streams of oil which is being filtered are very minute, whereby very small particles of foreign matter may be removed. The structures of the filter elements are also such that the resistance offered to the flow of the oil which is being filtered is as uniform as possible so that the flow will not be concentrated at a relatively few points. Eliminating such flow concentrations and employing layers of cohesive fabric or fibrous materials which are of a somewhat disintegration-resistant nature virtually eliminates any possibility of breakdowns of the filter elements which would permit channeling of unfiltered oil therethrough.

The filter elements are quite compact so that they may be mounted in containers which require only a small space, this being a particularly advantageous feature when the filters are used in connection with the oil systems of automobile engines, for example. The elements are of simple construction and may be manufactured and marketed at a relatively low cost so that they may be replaced inexpensively whenever the capacities thereof are reached.

Although I have disclosed herein various embodiments of my invention which I have described as being particularly adapted for removing foreign matter from lubricating oil, I do not desire to be limited thereto since the embodiments disclosed may be employed for filtering other fluids and since various changes, modifications and substitutions may be incorporated in the embodiments disclosed without departing from the spirit of the invention. Accordingly, I hereby reserve the right to the protection afforded by the full scope of my appended claims.

I claim as my invention:

1. A filter element having a longitudinal axis and having a pair of ends spaced apart along said axis, said element comprising: a spiral sheet having a plurality of convolutions of progressively increasing size which are spaced apart in directions normal to said axis, and having a pair of spiral edges which are spaced apart axially of said element and which define the respective ends of the element; and substantially parallel, spiral strips of filtering material which are spaced apart axially of the element and the convolutions of which are interleaved with said convolutions of said spiral sheet, said spiral strips dividing the space between said convolutions of said spiral sheet into spiral channels separated from each other axially of said element by said strips of filtering material, one of said spiral channels being open at its outer end to the outer surface of said element and being closed at its inner end, said channel being an inlet channel adapted to convey unfiltered fluid into said element, the adjacent spiral channel being closed at its outer end and open at its inner end and constituting an outlet channel adapted to convey fluid inwardly toward the center of said element along a spiral path, said outlet channel being separated from the ends of said element by said strips of filtering material.

2. A filter element according to claim 1 wherein said spiral sheet is provided with a plurality of inlet openings which register with said spiral inlet channel and which are adapted to provide fluid communication between the convolutions thereof, said inlet openings and said spiral inlet channel cooperating to form an inlet passage for unfiltered fluid.

3. A filter element according to claim 1 wherein said spiral sheet is provided with a plurality of outlet openings which register with said spiral outlet channel and which are adapted to provide fluid communication between the convolutions thereof, said outlet openings and said spiral outlet channel cooperating to form an outlet passage for filtered fluid.

4. A filter element according to claim 3 wherein said spiral sheet is provided with a plurality of inlet openings which register with said spiral inlet channel and which are adapted to provide fluid communication between the convolutions thereof, said inlet openings and said spiral inlet channel cooperating to form an inlet passage for unfiltered fluid.

5. A filter element as set forth in claim 4 having central passage means extending axially thereinto from one end thereof and communicating with said outlet passage.

6. A filter element having a longitudinal axis and having a pair of ends spaced apart along said axis, said element comprising: a spiral sheet having a plurality of convolutions of progressively increasing size which are spaced apart in directions normal to said axis, and having a pair of spiral edges which are spaced apart axially of said element and which define the respective ends of the element; and a plurality of pairs of substantially parallel, spiral strips of filtering material which are spaced apart axially of the element and the convolutions of which are interleaved with said convolutions of said spiral sheet, said spiral strips of filtering material dividing the space between said convolutions of said spiral sheet into a plurality of spiral inlet channels and a plurality of spiral outlet channels, said inlet and outlet channels being spaced apart axially of said element and being separated from each other by said strips of filtering material, each of said outlet channels being disposed between a pair of adjacent inlet channels, said outlet channels being separated from the ends of said element by said strips of filtering material, said inlet channels being adapted to convey unfiltered fluid into said element and being closed at their inner ends and open at their outer ends at the outer side surface of said element, and said outlet channels being adapted to convey filtered fluid inwardly toward the center of said element along spiral paths and being open at their inner ends at the center of said element and being closed at their outer ends.

7. A filter element as set forth in claim 6 wherein said spiral sheet is provided with a plurality of outlet openings each of which registers with one of said spiral outlet channels and is adapted to provide fluid communication between adjacent convolutions thereof.

8. A filter element according to claim 7 wherein said spiral sheet is provided with a plurality of inlet openings each of which registers with one of said spiral inlet channels and is adapted to provide fluid communication between adjacent convolutions thereof.

9. A filter element according to claim 6 wherein the length of said strips is less than the length of said spiral sheet and wherein each strip of each pair is joined at its ends to the respective ends of the other strip of the pair.

WALTER W. BOGGS.

REFERENCES CITED

The following references are of record in the file of this patent:

UNITED STATES PATENTS

| Number | Name | Date |
|---|---|---|
| 425,431 | Hyatt | Apr. 15, 1890 |
| 2,311,377 | Gaertner | Feb. 16, 1943 |
| 2,322,548 | Sigmund | June 22, 1943 |
| 2,339,703 | Kamrath | Jan. 18, 1944 |
| 2,427,862 | Judkins | Sept. 23, 1947 |

FOREIGN PATENTS

| Number | Country | Date |
|---|---|---|
| 281,857 | Great Britain | Dec. 15, 1927 |